(12) United States Patent
Chandramouleeswaran et al.

(10) Patent No.: US 7,260,712 B2
(45) Date of Patent: Aug. 21, 2007

(54) TRANSACTIONAL KERNEL CONFIGURATION

(75) Inventors: Aswin Chandramouleeswaran, Santa Clara, CA (US); Steven T. Roth, Sunnyvale, CA (US); C. P. Vijay Kumar, Sunnyvale, CA (US); Daniel R. Mathias, Dayton, NV (US); Harshavardhan R. Kuntur, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 395 days.

(21) Appl. No.: 10/944,984

(22) Filed: Sep. 20, 2004

(65) Prior Publication Data
US 2006/0064578 A1    Mar. 23, 2006

(51) Int. Cl.
*G06F 15/177* (2006.01)

(52) U.S. Cl. .......................................... 713/1; 713/100

(58) Field of Classification Search ................... 713/1, 713/100
See application file for complete search history.

(56) References Cited

U.S. PATENT DOCUMENTS

| | | | |
|---|---|---|---|
| 5,956,507 A * | 9/1999 | Shearer et al. | 718/104 |
| 6,112,301 A * | 8/2000 | Johnson | 713/1 |
| 6,996,828 B1 * | 2/2006 | Kimura et al. | 719/319 |
| 2002/0023211 A1 * | 2/2002 | Roth et al. | 713/164 |

FOREIGN PATENT DOCUMENTS

JP    2000293362 A  * 10/2000

OTHER PUBLICATIONS

Hewlett-Packard Development Company, L.P., Managing Kernel Configurations in HP-UK 11i Version 2, pp. 1-38 (May 2003).

* cited by examiner

*Primary Examiner*—Thuan Du

(57) ABSTRACT

Systems, methods, and devices are provided for transactional kernel configuration. One embodiment includes a kernel configuration tool, a system file accessible by the kernel configuration tool, and program instructions executable by the kernel configuration tool to immediately and persistently apply kernel configuration changes a manner that ensures a transactional kernel configuration change.

41 Claims, 5 Drawing Sheets

300

|  | READ 302-1 | VALIDATE 302-2 | APPLY 302-3 | WRITE 302-4 |
|---|---|---|---|---|
| 301-1 MODULES |  |  |  |  |
| 301-2 TUNABLES |  |  |  |  |
| 301-3 SWAP |  |  |  |  |
| 301-4 DUMP |  |  |  |  |
| 301-5 DEVICE BINDINGS |  |  |  |  |
| 301-N |  |  |  |  |

*Fig. 3*

TRANSACTIONAL KERNEL CONFIGURATION

BACKGROUND

In a computing device, such as a server, router, desktop computer, laptop, etc., and other devices having processor logic and memory, the device includes an operating system and a number of application programs that execute on the computing device. The operating system and program applications are typically arranged in different layers of the device's computing structure. For example, many computing devices include an operating system layer and an application layer to enable the device to perform various tasks.

The operating system layer includes a "kernel". The kernel is a master control program that runs the computing device. The kernel provides functions such as task, device, and data management, among others. The application layer includes application programs that perform particular tasks. These programs can typically be added by a user or administrator as options to a computer device. Application programs are executable instructions, which are located above the operating system layer and accessible by a user.

The application layer and other user accessible layers are often referred to as being in "user space", while the operating system layer can be referred to as "kernel space". As used herein, "user space" implies a layer of code which is more easily accessible to a user or administrator than the layer of code which is in the operating system layer or "kernel space".

In various types of operating systems kernel configuration changes can be made that take effect immediately, i.e., without the need for reboot. The same kernel configuration changes can be made in a manner that affects subsequent boots of the system. However, in these various types of operating systems, the system administrator has to use two separate mechanisms to accomplish these changes: one to affect the running system and a separate one to affect subsequent boots.

In many contexts in software, it is necessary to ensure that a set of operations, e.g., kernel configuration changes, is handled completely. The only acceptable outcomes are that all of the operations complete, or none of them do; partial completion is unacceptable. Such a set of operations is usually called a "transaction," and the completion of them in this fashion is said to be "atomic" or "transactional."

Previous approaches to kernel configuration changes do not ensure that changes are applied both immediately and persistently using a single mechanism. Nor have previous approaches provided a method to ensure that kernel configuration changes are handled in a transactional fashion.

BRIEF DESCRIPTION OF THE DRAWINGS

FIG. 3 illustrates an embodiment of a switch table suitable to implement with embodiments of a kernel configuration system.

DETAILED DESCRIPTION

A program embodiment is provided which executes instructions to implement kernel configuration changes in a manner that is both immediate and persistent using a single mechanism. A program embodiment is provided which executes instructions to ensure that kernel configuration changes are handled in a transactional fashion. A program embodiment is also provided which executes instructions to implement a switch table which includes a series of sub-operations executed according to a defined sequence. The program instructions execute to accommodate changes to a list of kernel domain entities that are managed by kernel configuration tools in a manner which is un-intrusive to kernel configuration tool code and design.

As the reader will appreciate, one way to implement transactional semantics is through "n-phase commit", where n is typically 2 or 3. In this model, each of the operations is visited multiple times, progressing in a pipelined fashion such that none of them commit (make permanent) their operation until all of them have passed the point where failures are possible. Another method includes a backout approach: each of the operations is reversible, and if one of them fails, the preceding successful ones are reversed.

Changes to a kernel configuration are an instance where transactional semantics are useful. When switching from one kernel configuration to another, changes may have to be made to module states, tunable values, and device bindings (and potentially other things in the future). Embodiments of the present invention include the application of both an n-phase commit and a backout technique to the kernel configuration environment for making kernel configuration changes in a transactional manner.

Previous approaches to kernel configuration changes made immediate kernel configuration changes using one mechanism and persistent kernel configuration changes using a different mechanism. Program embodiments according to the present invention execute to make immediate and persistent kernel configuration changes using a single mechanism and in a manner that ensures all kernel configuration changes are committed, i.e., made permanent, or none are.

Figure 1:
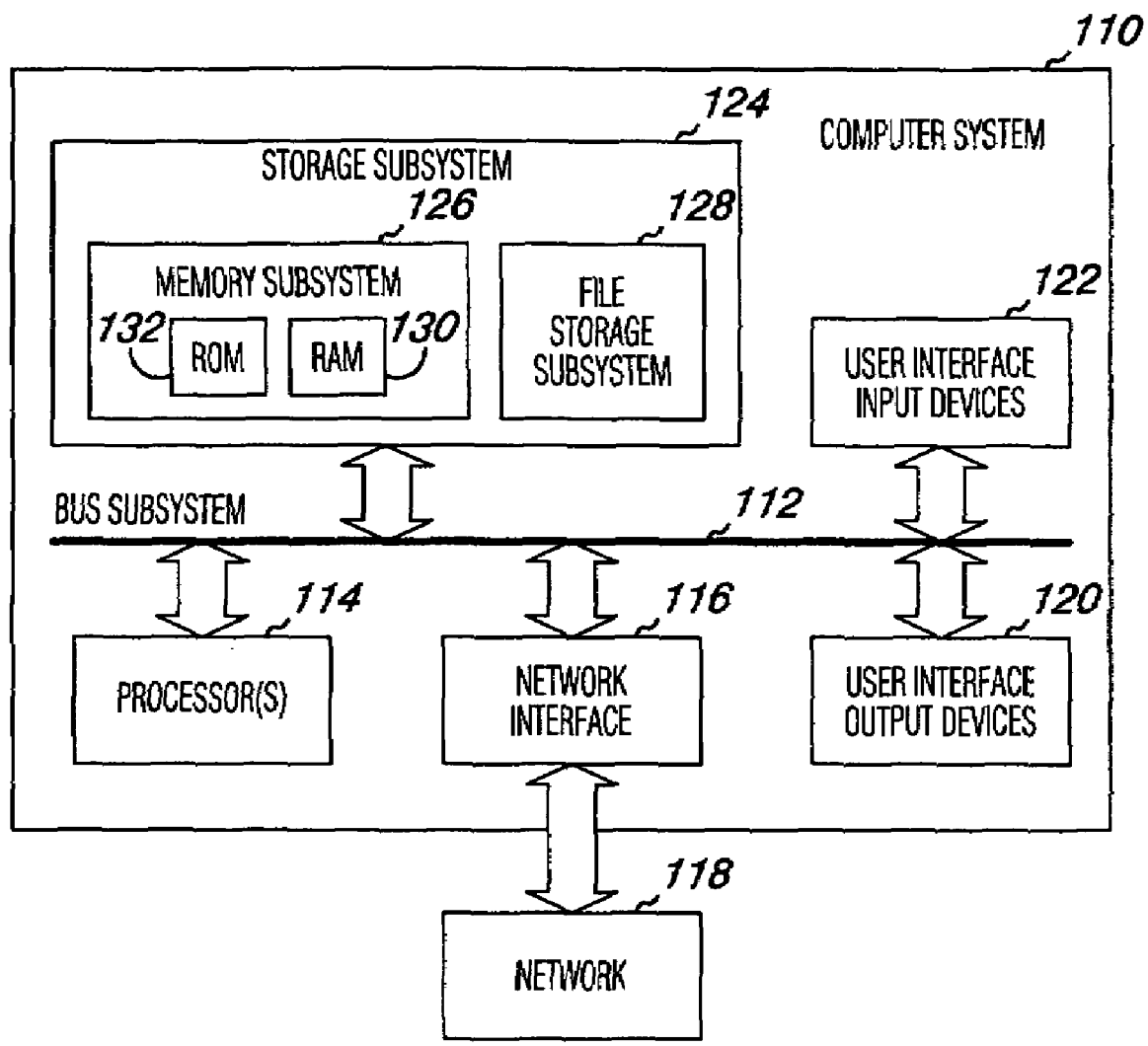
FIG. 1 is a block diagram of a computer system suitable to implement embodiments of the invention.

FIG. 1 is a block diagram of a computer system 110 suitable to implement embodiments of the invention. Computer system 110 includes at least one processor 114 which communicates with a number of other computing components via bus subsystem 112. These other computing components may include a storage subsystem 124 having a memory subsystem 126 and a file storage subsystem 128, user interface input devices 122, user interface output devices 120, and a network interface subsystem 116, to name a few. The input and output devices allow user interaction with computer system 110. Network interface subsystem 116 provides an interface to outside networks, including an interface to network 118 (e.g., a local area network (LAN), wide area network (WAN), Internet, and/or wireless network, among others), and is coupled via network 118 to corresponding interface devices in other computer systems. Network 118 may itself be comprised of many interconnected computer systems and communication links, as the same are known and understood by one of ordinary skill in the art. Communication links as used herein may be hardwire links, optical links, satellite or other wireless communications links, wave propagation links, or any other mechanisms for communication of information.

User interface input devices 122 may include a keyboard, pointing devices such as a mouse, trackball, touchpad, or graphics tablet, a scanner, a touchscreen incorporated into a display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may be a cathode ray tube (CRT), a flat-panel device such as a liquid crystal display (LCD) and/or plasma display, or a projection device (e.g., a digital light processing (DLP) device among others). The display subsystem may also provide non-visual display such as via audio output devices. In general, use of the term "output device" is intended to include all possible types of devices and ways to output information from computer system 110 to a user or to another machine or computer system 110.

Storage subsystem 124 can include the operating system "kernel" layer and an application layer to enable the device to perform various functions, tasks, or roles. File storage subsystem 128 can provide persistent (non-volatile) storage for additional program and data files, and may include a hard disk drive, a floppy disk drive along with associated removable media, a compact digital read only memory (CD-ROM) drive, an optical drive, or removable media cartridges. Memory subsystem 126 typically includes a number of memories including a main random access memory (RAM) 130 for storage of program instructions and data during program execution and a read only memory (ROM) 132 in which fixed instructions are stored. As used herein, a computer readable medium is intended to include the types of memory described above. Program embodiments as will be described further herein can be included with a computer readable medium and may also be provided using a carrier wave over a communications network such as the Internet, among others.

Bus subsystem 112 provides a mechanism for letting the various components and subsystems of computer system 110 communicate with each other as intended. Although bus subsystem 112 is shown schematically as a single bus, alternate embodiments of the bus subsystem 112 may utilize multiple busses.

Program embodiments according to the present invention can be stored in the memory subsystem 126, the file storage subsystem 128, and/or elsewhere in a distributed computing environment as the same will be known and understood by one of ordinary skill in the art. Due to the ever-changing nature of computers and networks, the description of computer system 110 depicted in FIG. 1 is intended only as one example of a computing environment suitable for implementing embodiments of the present invention. Many other configurations of computer system 110 are possible having more or less components than the computer system depicted in FIG. 1.

Computing networks can include multiple computing devices such as servers, desktop PCs, laptops, and workstations, among other peripheral devices, e.g., printers, facsimile devices, and scanners, networked together across a local area network (LAN) and/or wide area network (WAN).

A LAN and/or WAN uses clients and servers that have network-enabled operating systems such as Windows, Mac, Linux, and Unix. An example of a client includes a user's workstation. Clients and servers can be connected in a client/server relationship in which the servers hold programs and data that are shared by the clients in the computing network.

As mentioned above, the kernel layer of a computer system manages the set of processes that are running on the system by ensuring that each process is provided with processor and memory resources at the appropriate time. A process refers to a running program, or application, having a state and which may have an input and output. The kernel provides a set of services that allow processes to interact with the kernel and to simplify the work of an application writer. The kernel's set of services is expressed in a set of kernel modules. A module is a self contained set of instructions designed to handle particular tasks within a larger program. Kernel modules can be compiled and subsequently linked together to form a kernel. Other types of modules can be compiled and subsequently linked together to form other types of programs. As used herein an operating system of a computer system can include a Unix, Linux, AIX, Windows, and/or Mac operating system, etc.

Figure 2A:
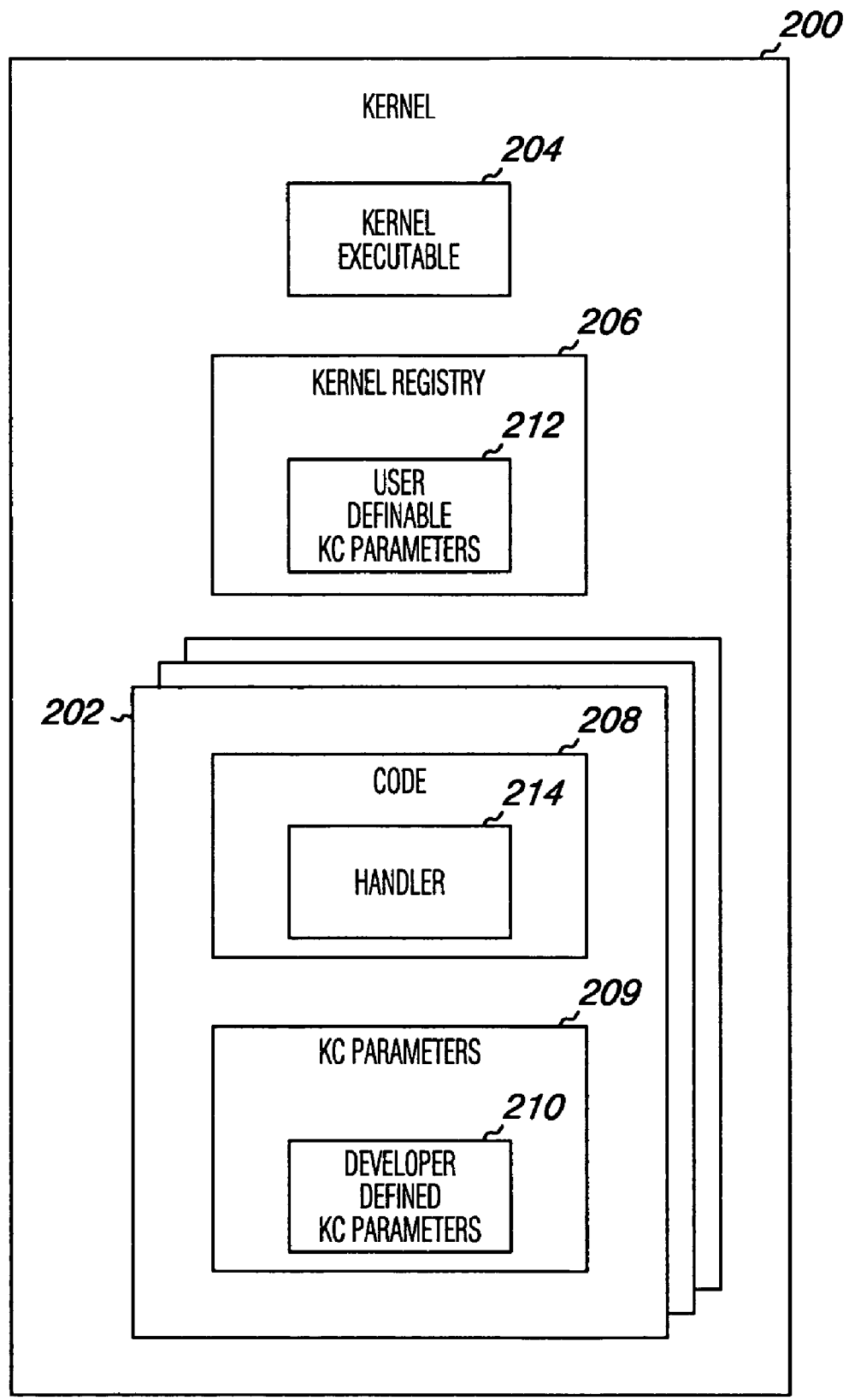
FIG. 2A illustrates a kernel configuration having a number of modules.

FIG. 2A illustrates a kernel configuration 200 having a number of modules 202. As one of ordinary skill in the art will appreciate, once a set of modules are created in a development environment for a kernel configuration 200 they are shipped from a supplier to a user or customer. Developer provided, kernel configuration (KC) parameters 209 can be made available to a system user, e.g., system administrator. Some kernel configuration parameters 209 (also referred to herein as logical settings) are set by the kernel developer (illustrated as 210), and cannot easily be changed subsequent to installation of the operating system kernel. Others (illustrated as 212) may be changed by a system user, e.g., system administrator, to provide a new logical setting. As mentioned above, logically a kernel configuration is a collection of all the administrator choices and settings needed to determine the behavior and capabilities of the kernel. This collection includes a set of kernel modules (each with a desired state), a set of kernel tunable parameter value assignments, a primary swap device, a set of dump device specifications, a set of bindings of devices to other device drivers, a name and optional description of the kernel configuration, etc.

Physically, a kernel configuration 200 is a directory that contains the files needed to realize a desired behavior for the operating system. The directory includes: a kernel executable 204, a set of kernel modules files 202, and a kernel registry database 206 (containing the logical settings described above). As illustrated in FIG. 2A each kernel module 202 includes kernel code 208 and kernel (KC) parameters, or logical settings, 209 (some developer defined 210 and some user definable 212 as illustrated in the kernel registry database 206). The kernel code 208 includes a kernel configuration handler function 214 which controls the kernel configuration parameters 209. Kernel tunables are one example of kernel configuration parameters 209 which control some behavior of the operating system kernel. The tunable parameters are integer values used to define how the kernel is to behave. For example, tunable values can include a setting for the number of processes for each user on a system, a setting for a total number of processes on the system, security features, etc. The tunable values are initialized by a tunable initialization function, which is part of the kernel code. Kernel tunable parameters are usually managed manually. Some tunable value changes, e.g. by a system administrator, can be implemented immediately to a running system, others cannot and some can only be implemented through rebuilding the kernel. For example, it is not possible to immediately reduce the value of some resource below a current usage. When a kernel configuration parameter change, e.g., tunable value change, cannot be implemented immediately, the kernel may hold the value change in the kernel registry 206 and apply it at a later time, e.g., a next reboot.

In one example Unix environment, the operating system kernel is a collection of around 350 kernel modules and has as many as 200 kernel tunables. This example environment is discussed herein for ease of illustration. However, the reader will appreciate that embodiments are not limited to a Unix operating system environment. In this Unix example, the kernel configuration parameters are managed by three commands known as kconfig, kcmodule, and kctune.

The kconfig command is used to manage whole kernel configurations. It allows configurations to be saved, loaded, copied, renamed, deleted, exported, imported, etc. It can also list existing saved configurations and give details about them.

The kcmodule command is used to manage kernel modules. Kernel modules can be device drivers, kernel subsystems, or other bodies of kernel code. Each module can have various module states including unused, static (compiled into the kernel and unable to be changed without rebuilding and rebooting), and/or dynamic (which can include both "loaded", i.e., the module is dynamically loaded into the kernel, and "auto", i.e., the module will be dynamically loaded into the kernel when it is first needed, but has not been yet). That is, each module can be unused, statically bound, e.g., bound into the main kernel executable, or dynamically loaded. These states may be identified as the states describing how the module will be used as of the next system boot and/or how the module is currently being used in the running kernel configuration. Kcmodule will display or change the state of any module in the currently running kernel configuration or a saved configuration.

Kctune is used to manage kernel tunable parameters. As mentioned above, tunable values are used for controlling allocation of system resources and tuning aspects of kernel performance. Kctune will display or change the value of any tunable parameter in the currently running configuration or a saved configuration.

As the reader will appreciate, kernel configuration consists of configuring and managing fairly distinct kernel domain entities. Some of these domain entities include those mentioned above, e.g., kernel tunables and kernel modules. In one Unix environment example, the list of domain entities that are currently managed by kernel configuration tools (described below) additionally includes "swap" devices (e.g., other memory media such as a floppy, hard disk, designated disk(s), etc. to move memory that is not presently being used), "dump" devices (e.g., a designated memory to receive a "core dump" as the same is known in the art when deleterious events occur with the operating system), and device bindings (e.g., which hardware (disks, etc.) to use with different aspects of the operating system). One example of a device binding is the assignment of a particular driver to a hardware device. This list of domain entities may grow or contract. Accordingly, embodiments are provided (e.g., as described in connection with FIG. 3) which can accommodate changes to the list of kernel domain entities that are managed by kernel configuration tools in a manner that is un-intrusive to kernel configuration tools code and design.

Figure 2B:
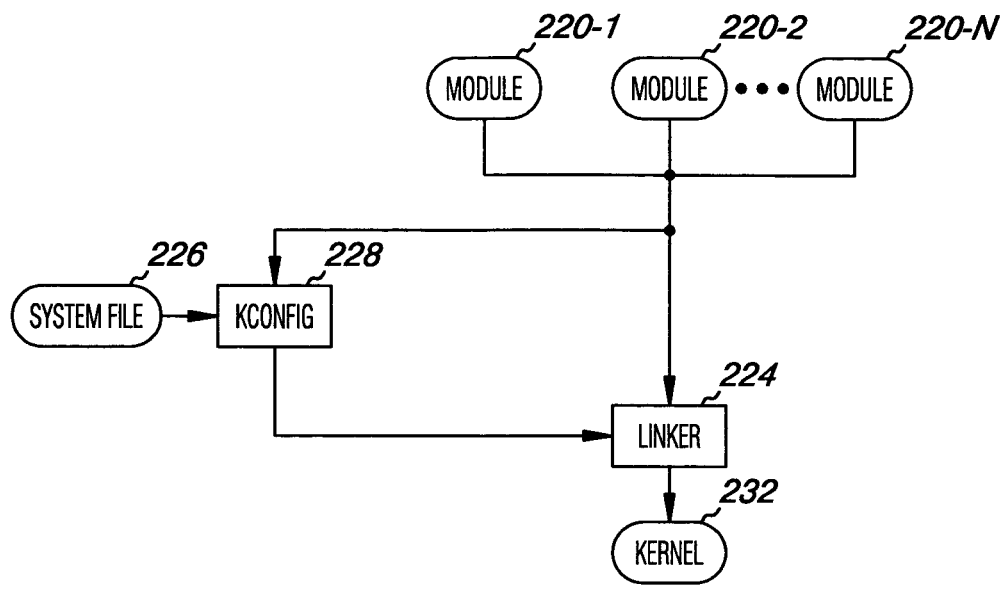
FIG. 2B is a block diagram of an embodiment of a kernel build system suitable to implement embodiments of the invention.

FIG. 2B is a block diagram of an embodiment of a build system suitable to implement embodiments of the invention. As shown in the example illustration of FIG. 2B a system user, e.g., a system administrator, may be provided with access to a number of modules, 220-1, 220-2, . . . , 220-N, and be able to load and unload modules (described below) from a kernel configuration 200 as part of installing, updating (upgrading), and/or managing an operating system kernel on a system. As the reader will appreciate, once a set of modules are created in a development environment for an operating system kernel 200 they are shipped from a supplier to a user or customer. As illustrated in FIG. 2B, the modules in a kernel (e.g., modules 202 in kernel configuration 200 of FIG. 2A) which are sold and shipped to a customer can be provided to a linker utility 224 that is used to join modules together to make a program, e.g., kernel configuration, for the particular customer's system. This part of the process may be performed in either the development environment or the runtime environment, i.e., on a customer system.

As illustrated in the embodiment of FIG. 2B, a system user may be provided with a kernel configuration tool, shown as kconfig 228, which executes program instructions to implement the embodiments described in further detail below. The kconfig 228 tool can read the modules, e.g., 202 in FIG. 2A, in the developer provided kernel 200 to find out what modules are available. As illustrated in FIG. 2B the linker 224 can receive instructions from the kconfig 228 tool. The kconfig tool 228 can allow a system administrator to specify tunable variables, i.e., values that control the behavior of the modules, etc. Such administrator chosen values can be contained in customer system files 226. The customer supplied "system file" 226 also specifies which modules the customer wants to use. The result of this process is a complete program, e.g., kernel file 232, that the customer can install on and use to run their system.

As noted, the function of linking modules can be accomplished at the time that the entire software program is initially compiled and can be performed at a later time either by recompiling the program "offline" or, in some instances, while the program is executing "online" in a runtime environment. As the reader will appreciate most operating system users are interested in high availability. That is, business networks can experience significant losses when a network operating system is down "offline" even for an hour. In many customer environments, it may be difficult to justify taking a system "offline" to rebuild and/or even just rebooting in order to effectuate kernel configuration changes.

The process of linking modules at runtime is also referred to as loading a module. The reverse process of unlinking a module at runtime is referred to as unloading a module. Runtime loading and unloading accommodates the users desire for high availability. In many cases, when modules are loaded or unloaded the computing device or system has to be configured in a particular way in order for the module to load or unload correctly. For example, a module may have to seek access to another module to be properly loaded or unloaded. A module may also need access to other data to be used once the module is loaded. Additionally, a module may have to use program instructions to perform certain tasks in connection with the loading or unloading, e.g., may seek access to certain kernel parameters such as the aforementioned tunables, device bindings, swap and/or dump devices, etc. For example, a given tunable A may be defined as Tunable A=Tunable B+Tunable C. Thus, if either Tunable B or Tunable C changes then Tunable A has to change as well. If these operations are not accomplished correctly, such as before and/or after a module is loaded/unloaded, the loading and/or unloading of the module may not be achieved.

Figure 2C:
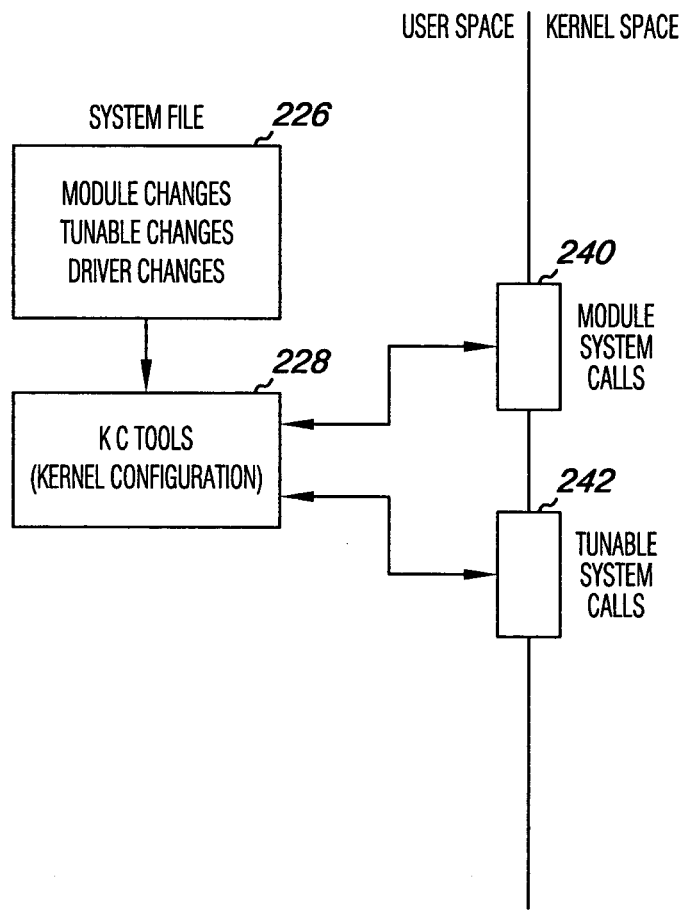
FIG. 2C is a block diagram of an embodiment of a kernel configuration change.

FIG. 2C is a block diagram of an embodiment of a kernel configuration system delineating between user space and kernel space. As noted above, a system user, e.g., a system administrator, may be provided with access to a kernel, e.g., 232 in FIG. 2B, as part of installing, updating (upgrading), and/or managing an operating system kernel on a system. As note above, some kernel configuration parameter changes can be implemented by a system user, e.g. by a system administrator, on a running system, i.e. without having to reboot the system or re-link modules. Some kernel configuration parameters can even be implemented immediately to a running system. FIG. 2C shows a system file 226 illustrating example module changes, tunable changes, driver changes, etc., e.g., by a system administrator. As shown in FIG. 2C, kernel configuration tools 228, such as described herein, can execute program instructions to implement these changes in kernel space via module system calls 240, tunable system calls 242, etc. For example, such kernel configuration changes can be implemented using the kcmodule and kctune commands described above.

As described below, program embodiments are provided which execute to make immediate and persistent kernel configuration changes using a single mechanism in a manner that ensures all kernel configuration changes are transactional, successfully made permanent, or none are. The program embodiments are provided to a computer system 110, e.g., via a kernel configuration tool 228. As discussed next, various embodiments include the application of a kernel configuration switch table, an n-phase commit technique, and a backout technique to the kernel configuration environment.

FIG. 3 illustrates an embodiment of a switch table 300 suitable to implement with embodiments of a kernel configuration change, e.g., as shown in FIG. 2C. As shown in the embodiment, the above described domain entities, e.g., modules, tunables, swap devices, dump devices, and device bindings, are listed along rows of the switch table 300. In the example illustration a modules domain entity is shown as 301-1, a tunables domain entity is shown as 301-2, a swap device domain entity is shown as 301-3, a dump device domain entity is shown as 301-4, and a device bindings domain entity is shown as 301-5. As illustrated in FIG. 3, a number of additional domain entities, e.g., 301-N, can be added to accommodate changes to the list of kernel domain entities that are managed by kernel configuration tools, e.g., 228 in FIGS. 2B and 2C. As the reader will appreciate, by having a switch table, such as shown in the embodiment of FIG. 3, domain entities can be added, deleted, and/or re-ordered in a manner which is non-intrusive to kernel configuration tool code and design.

Kernel configuration includes a series of sub-operations executed according to a defined sequence. These sub-operations are common irrespective of the kernel domain entity or entities that are being configured as part of a user requested kernel configuration operation. In one example Unix environment, the series of sub-operations includes reading the kernel configuration changes typed by a system user, validating configuration changes, applying configuration changes, and writing applied configuration changes to disk. Embodiments, however, are not limited to the above examples. In the embodiment of FIG. 3, these sub-operations are listed along columns of the switch table 300. In the example illustration a read sub-operation is shown as 302-1, a validate sub-operation is shown as 302-2, an apply sub-operation is shown as 302-3, and a write sub-operation is shown as 302-5. According to embodiments, each distinct kernel domain entity, e.g., 301-1, ..., 301-N, provides with a function address for every listed sub-operation, e.g., 302-1, ..., 302-4.

According to one program embodiment provided to the kernel configuration tool described herein, program instructions execute in conjunction with the switch table 300 of FIG. 3 (accessible from memory as same will be appreciated by one of ordinary skill in the art) such that a function listed in one column is executed for each domain entity listed in the rows, e.g., e.g., 301-1, ..., 301-N, of the switch table 300 before moving to the next column. For example, program embodiments execute instructions in conjunction with the switch table 300 to execute the "validate" function in column 302-2 for each domain entity listed in the rows (e.g., a modules domain entity 301-1, a tunables domain entity 301-2, a swap device domain entity 301-3, a dump device domain entity 301-4, a device bindings domain entity 301-5, and a number of additional domain entities, e.g., 301-N) before moving on to execute instructions in association with the "apply" function in column 302-3 for each row's domain entity. The program embodiments execute instructions to repeat this process for each column and row of the switch table 300 until all columns and rows have been accessed.

According to various embodiments, the program instructions execute to a one column's sub-operation function for each row in the order that the kernel domain entities are arranged in the rows, e.g., in the order the kernel domain entities are presented in the embodiment of FIG. 3. As noted previously, the program embodiments can be executed to accommodate changes to the domain entities listed in the rows to accommodate fewer or more domain entities, and/or changes to the order of the domain entity listed in the rows of the switch table 300 as suited to a particular operating system environment.

Figure 4:
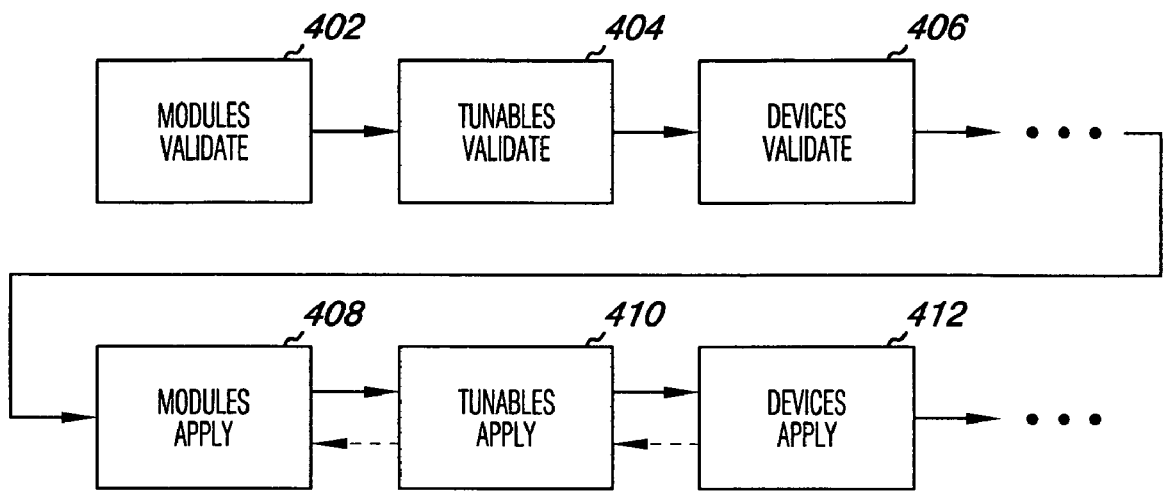
FIG. 4 is a flowchart illustrating an operational embodiment to the kernel configuration embodiments described herein.

FIG. 4 is a flowchart illustrating an operational embodiment to the kernel configuration embodiments described herein. The example embodiment of FIG. 4 illustrates the operation of a program embodiment, executed by a kernel configuration tool, using an n-phase commit approach with a backout capability to ensure a number of different types of kernel configuration changes, e.g., modules, tunables, and devices, are completed in a transactional fashion. The example embodiment of FIG. 4 illustrates a 2-phase commit approach. However, the reader will appreciate that the embodiments are not limited to this example and a different number "n", e.g., other than 2, can be employed with the n-phase commit technique described herein.

In the embodiment of FIG. 4, program instructions are executed such that changes to module states, tunable values, and device bindings are each validated in turn, looking for any potential errors that would block completion of the transaction. As shown in the embodiment of FIG. 4, program instructions execute to validate changes, e.g., new logical settings, to the module states first (e.g., module states being one type of configurable kernel parameter or logical setting) as shown at block 402. Next, program instructions execute to validate tunable parameters as shown at block 404. The program instructions then execute to validate device parameters, e.g., swap and dump devices and/or device bindings, as shown at block 406. According to various embodiments, the program instructions execute such that these example validation steps do not make any permanent changes. As such, if the program embodiments encounter errors along the way, the instructions execute to stop the process.

In the embodiment of FIG. 4, the program instructions execute such that once validation of all kernel configuration change operations succeeds, the program instructions will execute to then proceed with actually applying the kernel configuration change. As shown in the embodiment of FIG. 4, program instructions execute to apply changes, e.g., new logical settings, to the module states first as shown at block 408. Next, program instructions execute to apply tunable parameter changes as shown at block 410. The program instructions then execute to apply device parameter changes, e.g., swap and dump devices and/or device bindings, as shown at block 412. According to embodiments, these kernel configuration changes can be applied both in user space and kernel space. That is, as will be explained further below, the program instructions execute to apply the kernel configuration changes (e.g., new logical settings) to: a system file (e.g., 226 in user space in FIGS. 2B and 2C), a persistent storage mechanism (e.g., 128 in user space in FIG. 1); and a kernel (e.g., 232 in kernel space as shown FIGS. 2B and 2C) all in response to the single administrator request, e.g., through the use of the above described kconfig command. One example of applying kernel configuration changes, e.g., dynamic kernel tunables, to: a system file; a persistent storage mechanism; and a kernel, all in response to the single administrator request, is given in copending application entitled, "Dynamic Kernel Tunables", application Ser. No. 09/875,289, filed on Jun. 7, 2001, assigned to the instant assignee, and incorporated by reference.

In 2-phase commit embodiment of FIG. 4, the program instructions execute to prevent errors from occurring in the "apply" stage, e.g., 408, 410, and 412. That is, the program instructions execute in the "validate" stage, e.g., 402, 404, and 406, to guard against all possible error conditions. In practice, however, some error conditions cannot be prevented. According to the embodiments described herein, the validate stage, 402, 404, and 406, will catch most possible error conditions, but for those that remain, the program embodiments can be executed to provide a backout approach or technique (represented in FIG. 4 by dashed arrows). As illustrated in the example embodiment of FIG. 4, if the program embodiments detect error conditions while applying tunable changes 410, e.g., a selected module state (unused, static, and/or dynamic as described above) cannot support a given tunable parameter change, then the program instructions execute to backout the tunable parameter changes and return to the modules apply block 408 where the program instructions execute to backout the corresponding module state changes and report the action to a system user. The system user can then execute instructions to select a different module state to apply. Also, as shown in FIG. 4, if the program embodiments detect error conditions while applying device changes 412, e.g., a selected tunable parameter (security feature, etc.) is not available with a chosen driver, then the program instructions execute to backout the device setting and then return to the tunables apply block 410 where the program instructions execute to backout the tunable value changes, and then the program instructions execute to return to the modules apply block 408 to backout the module state changes and report these actions to the system user. The system user can then execute instructions to select a different tunable parameter to apply. The reader will appreciate additional examples, beyond those listed above, which are within the scope of embodiments of this application.

The reader will further appreciate that, according to various embodiments, the ordering of the kernel configuration change operations is particularly chosen. For example, while module states and tunable values both have the possibility of failure, tunable values cannot (in general) support backout. That is, as noted previously, in a running system it is not possible to immediately reduce the value of some resource below a current usage. For example, a system administrator can request a change to a tunable parameter such as how many processes will be allowed per system user or how many processes will be allowed on the system at one time above a current or previous logical setting, but cannot lower the parameter below current resource usage without rebooting. Hence, as illustrated in the embodiment of FIG. 4, the program instructions execute to handle the tunable parameters after the module states. When a kernel configuration parameter change, e.g., tunable value change, cannot be implemented immediately, the kernel may hold the value change in the kernel registry 206 and apply it at a later time, e.g., a next reboot.

Figure 5:
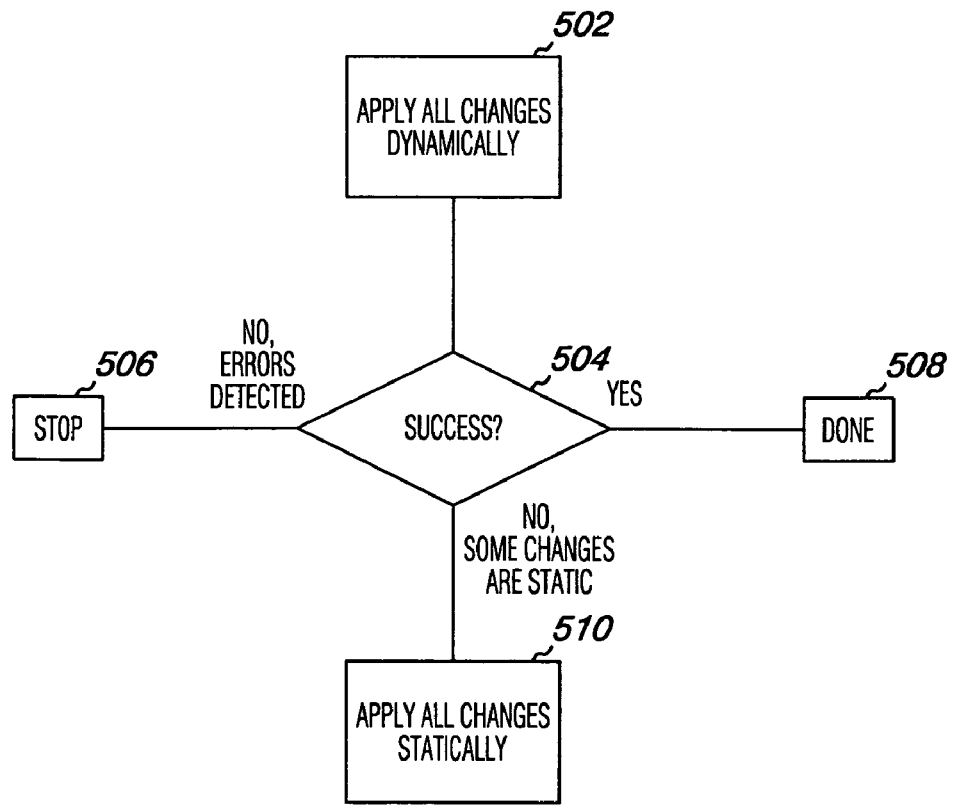
FIG. 5 is a flowchart illustrating another operational embodiment to the kernel configuration embodiments described herein.

FIG. 5 is a flowchart illustrating another operation embodiment to the kernel configuration embodiments described herein. FIG. 5 is useful to illustrate that according to various program embodiments described herein there is a second layer of transactional semantics. As the reader will recall from above, some module state and tunable value changes can be applied without rebooting the system (e.g., "dynamic changes"), while others (including all device binding changes) cannot take effect until reboot (e.g., "static changes"). Accordingly, various program embodiments can be executed to ensure that, if any changes are static, all changes in the transaction are held for reboot.

In order to do this, program embodiments execute to first attempt to process a kernel configuration change operation dynamically, treating any static changes as a cause to hold all changes pending for a next boot. That is, as shown in block 502, the program instructions execute to first attempt to apply kernel configuration changes dynamically. As shown in decision block 504, program instructions execute to check whether applying the kernel configuration changes dynamically was a success, i.e., did not result in detection of static changes. As stated above, the program embodiments execute to treat the presence of a static change, among the kernel configuration changes, as a cause for reapplying all changes (including those that can be implemented dynamically) in a static manner.

As shown in the embodiment of FIG. 5, if the program instructions do not detect a static change, i.e., all kernel configuration changes were dynamically applied without errors, then the process is complete as shown at block 508. If, however, the program embodiments do detect an error, then the program instructions execute to stop the process as shown in block 506. As the reader will appreciate, the program instructions execute to employ the n-phase commit and backout mechanisms described in connection with FIG. 4 in order to catch any static kernel configuration changes and to ensure that no change is applied if a static change is found. If this first attempt does not complete, due to presence of static changes, the program instructions execute to re-process the kernel configuration change operation in a static fashion as shown in block 510 to ensure the kernel configuration changes are completed in a transactional fashion.

As described herein, program embodiments are provided to apply kernel configuration changes both immediately and persistently in a transactional manner. The reader will appreciate that the above described program embodiments can be employed in connection with applying and writing kernel configuration changes to: update a system file including various types of kernel configuration information, each type of kernel configuration information having a logical setting, with a new logical setting for one or more of the types of kernel configuration information in response to a single administrator request (e.g., a requests using a kconfig command); update a persistent storage mechanism including the set of kernel configuration information with the new logical setting in response to the single administrator request; and change a kernel configuration setting in a kernel of a computing device with the new logical setting while continuing to run the computing device with the new logical setting.

For example, in association with a tunable kernel configuration change, the process begins in user space when a kernel configuration change command is invoked by a system administrator, e.g., using a kconfig command. According to the various embodiments, the program instructions execute to begin the process in user space, e.g., executing to perform an n-phase commit and backout technique as described herein. The program instructions then execute to go into kernel space, e.g., via a system call, and execute an n-phase commit and backout technique in the kernel. As the reader will appreciate, in the kernel the n-phase commit in the kernel includes a table of function pointers, such as the switch table described in connection with FIG. 3, that are called in each phase.

With module states a system call is made to the kernel but an n-phase commit is not used. With device bindings, the system user would be selecting a desired device binding, e.g., a desired driver, in the user space to force the ordering from among acceptable device bindings. Otherwise the system would take control of all device bindings provided in a hierarchical listing of available device bindings and likely apply the first acceptable one from among the list, which may or may not be the user's desired device binding and/or a most appropriate device binding.

Once the kernel configuration changes have been completed in a transactional manner in the kernel, the program instructions execute to return to user space and execute to "apply" and to "write" the same kernel configuration changes (e.g., new logical settings) to a system file (e.g., 226 in user space in FIGS. 2B and 2C) and to a persistent storage mechanism (e.g., 128 in user space in FIG. 1), all in response to the single administrator request (e.g., kconfig command). Thus, according to the embodiments described herein, kernel configuration changes can be applied both immediately and persistently in a transactional manner.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A kernel configuration tool, comprising:
   a processor;
   a memory coupled to the processor; and
   program instructions provided to the memory and executable by the processor to perform a number of validation steps as part of a transactional kernel configuration before making a transactional kernel configuration change permanent and ordering the transactional kernel configuration change such that changes which can support backout are performed first in order to:
   update a system file including various types of kernel configuration information, each type of kernel configuration information having a logical setting, with a new logical setting for one or more of the types of kernel configuration information in response to a single administrator request;
   update a persistent storage mechanism including the set of kernel configuration information with the new logical setting in response to the single administrator request; and
   change a kernel configuration setting in a kernel of a computing device with the new logical setting while continuing to run the computing device with the new logical setting.

2. The tool of claim 1, wherein the various types of kernel configuration information includes a set of kernel modules, each with a desired state, a set of kernel tunable parameter value assignments, a primary swap device, a set of dump device specifications, and a set of bindings of devices to other device drivers.

3. The tool of claim 1, wherein the program instructions execute to compile the kernel and to incorporate the new logical setting into the kernel.

4. The tool of claim 1, wherein the persistent storage mechanism is a kernel registry service.

5. A kernel configuration tool, comprising:
   a processor;
   a memory coupled to the processor; and
   program instructions provided to the memory and executable by the processor to:
   perform a number of validation steps as part of a transactional kernel configuration before making a transactional kernel configuration change permanent; and
   ordering the transactional kernel configuration change such that changes which can support backout are performed first.

6. The tool of claim 5, further performing a modules validate step first, then a tunables validate, then a devices validate.

7. The tool of claim 6, further including performing a modules apply step, then a tunables apply, then a devices apply.

8. The tool of claim 7, further including checking whether a kernel configuration change includes a static change.

9. The tool of claim 8, wherein the program instructions execute to apply all changes statically when the kernel configuration change includes at least one static change.

10. A kernel configuration tool, comprising:
    a processor;
    a memory coupled to the processor; and program instructions provided to the memory and executable by the processor to:
  access a switch table in association with a kernel configuration change, a kernel configuration having a number of kernel domain entities, wherein each row in the switch table provides a function address for a given kernel domain entity, and wherein each column in the switch table includes a sub-operation for the kernel configuration change; and
  execute the sub-operation in one column for each kernel domain entity before proceeding to the sub-operation a next column.

11. The tool of claim 10, wherein the number of kernel domain entities includes domain entities for:
  a tunable;
  a module;
  a swap device;
  a dump device; and
  a device binding.

12. The tool of claim 10, wherein the columns in the switch table includes a column for:
  a read sub operation;
  a validate sub operation;
  an apply sub operation; and
  a write sub operation.

13. The tool of claim 10, wherein the program instructions execute to add a kernel domain entity to a row of the switch table in a non-intrusive manner.

14. A computer readable storage medium, having a program, when executed by a device, to cause the device to perform a method, comprising:
  performing a number of validation steps as part of a transactional kernel configuration before making a transactional kernel configuration change permanent;
  ordering the transactional kernel configuration change such that changes which can support backout are performed first;
  updating a system file including various types of kernel configuration information, each type of kernel configuration information having a logical setting, with a new logical setting for one or more of the types of kernel configuration information in response to a single administrator request;
  updating a persistent storage mechanism including the set of kernel configuration information with the new logical setting in response to the single administrator request; and
  changing a kernel configuration setting in a kernel of a computing device with the new logical setting while continuing to run the computing device with the new logical setting.

15. The medium of claim 14, wherein the various types of kernel configuration information includes a set of kernel modules, each with a desired state, a set of kernel tunable parameter value assignments, a primary swap device, a set of dump device specifications, and a set of bindings of devices to other device drivers.

16. The medium of claim 14, further including:
  validating a number of kernel configuration parameters in association with one or more new logical settings; and
  upon successful validation of all kernel configuration parameters, proceeding to apply the parameters in a sequence that supports a transactional kernel configuration change.

17. The medium of claim 14, further including:
  accessing a switch table in association with a kernel configuration change, a kernel configuration having one or more kernel domain entities, wherein each row in the switch table provides a function address for a given kernel domain entity, and wherein each column in the switch table includes a sub-operation for the kernel configuration change; and
  executing the sub-operation in one column for each kernel domain entity before proceeding to the sub-operation a next column.

18. The medium of claim 14, further including compiling the kernel to incorporate the new logical setting into the kernel.

19. The medium of claim 14, wherein the persistent storage mechanism is a kernel registry service.

20. A computer readable storage medium having a program, when executed by a device, to cause the device to perform a method, comprising:
  validating a number of kernel configuration parameters in association with a kernel configuration change;
  ordering the kernel configuration change such that changes which can support backout are performed first; and
  upon successful validation of all kernel configuration parameters, proceeding to apply the parameters in a sequence that supports a transactional kernel configuration change.

21. The medium of claim 20, wherein the number of kernel configuration parameters include parameters for a kernel module, a kernel tunable, a primary swap device, a dump device, and a device binding, the method further including:
  validating one or more kernel module parameters first;
  validating one or more kernel tunable parameters second; and
  validating one or more device parameters third.

22. The medium of claim 21, after validating the number of kernel parameters the method including:
  applying one or more kernel module parameters first;
  applying one or more kernel tunable parameters second; and
  applying one or more device parameters third.

23. The medium of claim 22, further including checking whether the kernel configuration change includes a static change.

24. The medium of claim 23, further including applying all kernel configuration parameter changes statically when the kernel configuration change includes at least one static change.

25. A computer readable storage medium having a program, when executed by a device, to cause the device to perform a method, comprising:
  accessing a switch table in association with a kernel configuration change, a kernel configuration having one or more kernel domain entities, wherein each row in the switch table provides a function address for a given kernel domain entity, and wherein each column in the switch table includes a sub-operation for the kernel configuration change; and
  executing the sub-operation in one column for each kernel domain entity before proceeding to the sub-operation a next column.

26. The medium of claim 25, wherein the one or more kernel domain entities include domain entities for:
  a tunable;
  a module;
  a swap device;
  a dump device; and
  a device binding.

27. The medium of claim 25, wherein the columns in the switch table includes a column for:
a read sub operation;
a validate sub operation;
an apply sub operation; and
a write sub operation.

28. The medium of claim 25, further including adding a kernel domain entity to a row of the switch table in a non-intrusive manner.

29. A computer readable storage medium having a program, when executed by a device, to cause the device to perform a method, comprising:
accessing a switch table in association with a kernel configuration change, a kernel configuration having one or more kernel domain entities, wherein each row in the switch table provides a function address for a given kernel domain entity, and wherein each column in the switch table includes a sub-operation for the kernel configuration change; and
executing the sub-operation in one column for each kernel domain entity before proceeding to the sub-operation a next column, wherein the one or more kernel domain entities include a tunable, a module, a swap device, a dump device, and device binding, each having associated parameters, mid wherein the program executes to:
validate one or more kernel module parameters first;
validate one or more kernel tunable parameters second;
validate one or more device parameters third; and
upon successful validation of all kernel configuration parameters, proceed to apply the parameters in a sequence that supports a transactional kernel configuration change.

30. The medium of claim 29, further including ordering the kernel configuration change such that changes which can support backout are performed first.

31. The medium of claim 29, wherein, after validating the number of kernel parameters, the program instructions execute to:
apply one or more kernel module parameters first;
apply one or more kernel tunable parameters second; and
apply one or more device parameters third.

32. The medium of claim 29, wherein the program instructions execute to check whether the kernel configuration change includes a static change.

33. The medium of claim 32, wherein the program instructions execute to apply all kernel configuration parameter changes statically when the kernel configuration change includes at least one static change.

34. The medium of claim 33, wherein the program instructions execute to:
update a system file including various types of kernel configuration information, each type of kernel configuration information having a logical setting, with a new logical setting for one or more of the types of kernel configuration information in response to a single administrator request; and
update a persistent storage mechanism including the set of kernel configuration information with the new logical setting in response to the single administrator request.

35. A kernel configuration system, comprising:
a kernel configuration tool;
a system file accessible by the kernel configuration tool; and
wherein the kernel configuration tool includes a tangible computer readable storage medium having program instructions stored thereon which are executed by a processor to:
apply kernel configuration changes in a manner that ensures a transactional kernel configuration change;
access a switch table in association with a kernel configuration change, a kernel configuration having one or more kernel domain entities, wherein each row in the switch table provides a function address for a given kernel domain entity, and wherein each column in the switch table includes a sub-operation for the kernel configuration change; and
perform the sub-operation in one column for each kernel domain entity before proceeding to the sub-operation a next column.

36. The system of claim 35, wherein the one or more kernel domain entities include a tunable, a module, a swap device, a dump device, and device binding, each having associated parameters, and wherein the program instructions execute to:
validate one or more kernel module parameters first;
validate one or more kernel tunable parameters second;
validate one or more device parameters third; and
upon successful validation of all kernel configuration parameters, proceed to apply the parameters in a sequence that supports a transactional kernel configuration change.

37. The system of claim 36, wherein the program instructions execute to order the kernel configuration change such that changes which can support backout are performed first.

38. The system of claim 36, wherein after validating the number of kernel parameters the program instructions execute to:
applying one or more kernel module parameters first;
applying one or more kernel tunable parameters second; and
applying one or more device parameters third.

39. The system of claim 36, wherein the program instructions execute to check whether the kernel configuration change includes a static change.

40. The system of claim 39, wherein the program instructions execute to apply all kernel configuration parameter changes statically when the kernel configuration change includes at least one static change.

41. The system of claim 36, wherein the program instructions execute to:
update a system file including various types of kernel configuration information, each type of kernel configuration information having a logical setting, with a new logical setting for one or more of the types of kernel configuration information in response to a single administrator request; and
update a persistent storage mechanism including the set of kernel configuration information with the new logical setting in response to the single administrator request.

* * * * *

UNITED STATES PATENT AND TRADEMARK OFFICE
CERTIFICATE OF CORRECTION

| | | |
|---|---|---|
| PATENT NO. | : 7,260,712 B2 | Page 1 of 1 |
| APPLICATION NO. | : 10/944984 | |
| DATED | : August 21, 2007 | |
| INVENTOR(S) | : Aswin Chandramouleeswaran et al. | |

It is certified that error appears in the above-identified patent and that said Letters Patent is hereby corrected as shown below:

In column 3, line 45, delete "1 12" and insert -- 112 --, therefor.

In column 3, lines 46-47, delete "1 10" and insert -- 110 --, therefor.

In column 3, line 60, delete "1 10" and insert -- 110 --, therefor.

Signed and Sealed this

Twenty-second Day of July, 2008

JON W. DUDAS
*Director of the United States Patent and Trademark Office*